March 3, 1931.  B. S. MINOR  1,794,725
LUBRICATING DEVICE
Filed March 9, 1927

Inventor:
Burt S. Minor.
by Edmund A. Strauss
Attorney.

Patented Mar. 3, 1931

1,794,725

UNITED STATES PATENT OFFICE

BURT S. MINOR, OF SAN PEDRO, CALIFORNIA

LUBRICATING DEVICE

Application filed March 9, 1927. Serial No. 173,936.

This invention relates more particularly to a lubricating device for continuously applying a lubricant to the grooved periphery of cable sheaves in order to lubricate the contacting surface of wire cable lines passing thereover.

An important object of this invention is to provide a device that will uniformly distribute a lubricant in a thin even film to the grooved surface of cable sheaves for effectually lubricating the sheave contacting surface of cable lines as they are passed thereover.

Another object is to provide a device that will deliver a lubricant to cable lines in a manner that a major portion of the lubricant will be forced into the lines during their operation.

Still another object is to provide a device that is of inexpensive construction, that will distribute the lubricant in an even and economical manner to the cable lines or sheave surfaces, and which will not be liable to get out of order during its operation.

Further objects and advantages will be apparent from the following specification, reference being had to the drawings accompanying the same, in which, Fig. 1 is a sectional elevation through a well derrick crown block showing the lubricant distributing device mounted on the frame.

Figure 1:
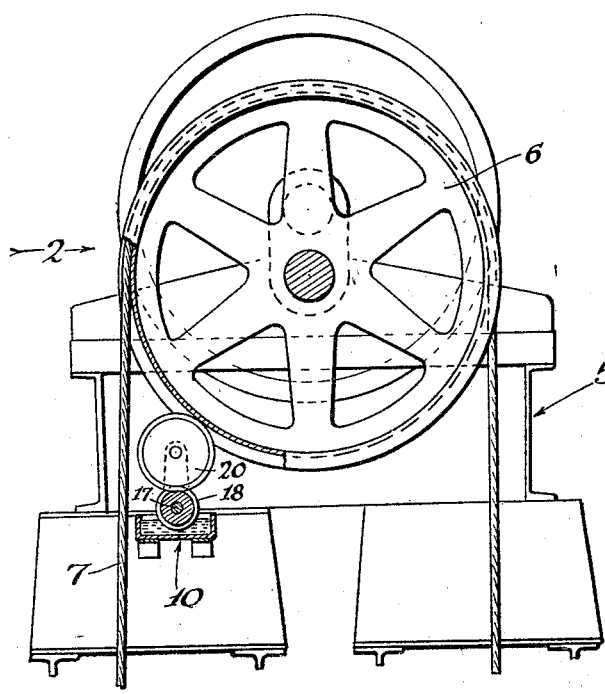
Figure 2:
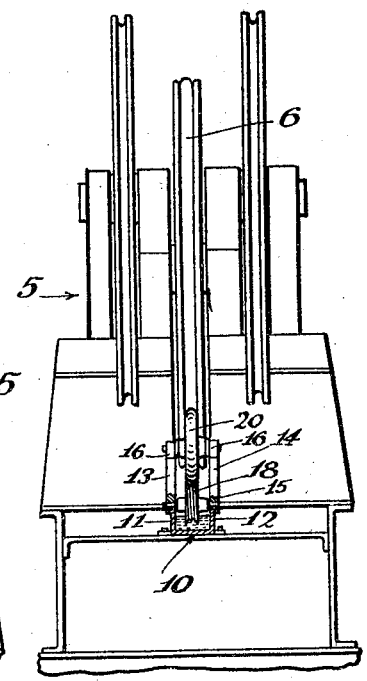
Fig. 2 is an end elevation of the device looking in the direction of the arrow 2 in Fig. 1.

The invention here illustrated is shown in connection with an oil derrick "crown block" applying a lubricant to the cable sheave over which passes the fast moving line from the oil well "draw works," but it will be understood that it may be used with equal facility and with as satisfactory results in other situations.

In the drawings, 5 designates the metal frame work of a derrick "crown block", and 6 the sheave over which passes the "fast moving" cable line 7 from the "draw works" located below on the derrick platform.

The lubricating device preferably comprises a shallow metal pan 10 capable of holding a quantity of lubricant sufficient to last a definite period of time. Mounted on the upper edges of the side walls 11, 12, of the lubricant pan are standards 13, 14, each having bearings 15, 16 disposed one above another in vertical alinement. Disposed in bearings 15 is a shaft 17 carrying a lubricant feeding wheel 18, provided on its concaved periphery with a coarse V-shaped screw thread 19, whose apexes are flattened in order that the lubricant from the pan may be evenly fed to lubricant distributing wheel 20 with which it contacts during the operation of the cable sheave.

Lubricant distributing wheel 20 is mounted on a shaft disposed in the upper bearings 16, and preferably consists of a metal wheel having a flat periphery provided with a centrally disposed annular groove 21 for holding in position thereon an annular rim 22, semi-circular in cross section formed of an elastic material, such as rubber, felt or a composition of that will not be affected by lubricants. The periphery of this elastic rim contacts with the concaved surface of the feeding wheel which evenly applies the lubricant thereto by reason of its threaded surface. The distributing wheel also contacts with the grooved surface of the main line sheave 6 over which passes the fast moving line 7 from the "draw works" (not shown).

As the elastic periphery of the distributing wheel contacts at all times with the grooved rim of the sheave, it will be apparent that the line 7 will be at all times fully and evenly lubricated on its contacting surface, thereby greatly increasing the life of the line by eliminating at least fifty (50%) percent of the friction that is generated during its movement when not provided with lubricants.

Figure 5:
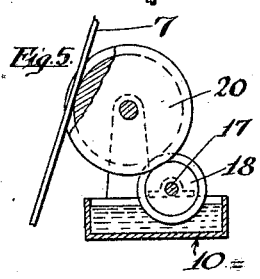
Fig. 5 is a side view partially in section of a modified form.
Figure 3:
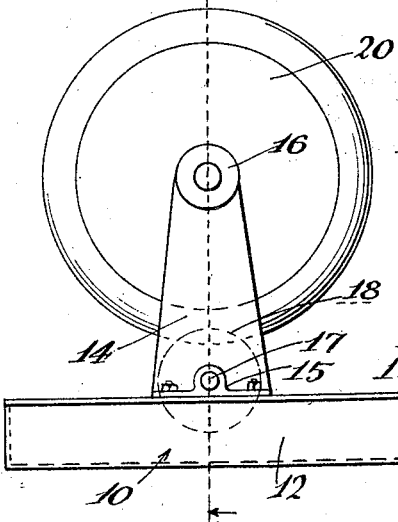
Fig. 3 is a side elevation of the lubricating device.

In Fig. 5 a modified form is illustrated in which the metal lubricant feeding wheel 25 is provided with a rounded surface that engages the concaved annular groove 26 of the distributing wheel 27, the groove in wheel engaging at all times the cable line 7 during its operation and efficiently lubricating the same.

Figure 6:
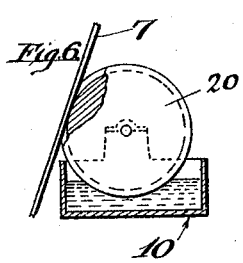
Fig. 6 is a view similar to the above of another modified form.
Figure 4:
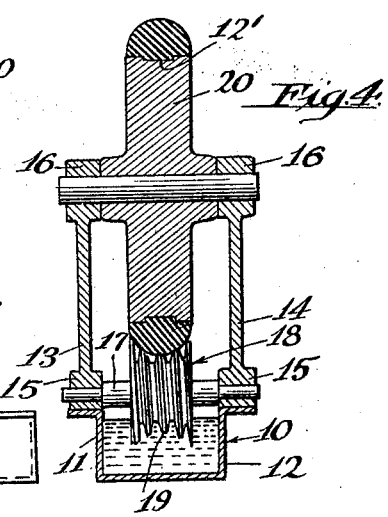
Fig. 4 is a vertical section taken on line 4—4 of Fig. 3.

In Fig. 6 a still further modification is shown in which the feeding wheel is dispensed with, a single wheel 28 having an annular grooved rim contacting directly with the cable line.

By providing a lubricant device and disposing the same in a position so that the lubricant is evenly applied to the sheave contacting surface of the cable lines during their operation, or to the grooved surface of the sheave over which the lines pass, it will be apparent that none of the lubricants so applied will be thrown off the line or sheave by reason of the centrifugal force generated by the fast rotating sheave, and that by such application to the lines a large percentage lubricant will be absorbed, thereby adding greatly to their life.

What I claim is:

1. A device for lubricating cable lines during their operation comprising a lubricant reservoir, a feeding wheel having concaved threaded periphery, a distributing wheel having a convexed elastic periphery engaging the threaded surface of a feeding wheel, said distributing wheel adapted to engage the grooved periphery of the cable sheave over which the cable line passes.

2. A device for lubricating cable lines during their operation comprising a lubricant reservoir, a feeding wheel having a concaved peripheral surface, said surface having a plurality of projections extending therefrom, a distributing wheel having a convexed periphery engaging the projections on the surface of the feeding wheel, said distributing wheel adapted to engage the grooved periphery of the cable sheave over which the cable line passes.

In witness that I claim the foregoing I have hereunto subscribed my name this 8th day of February, 1927.

BURT S. MINOR.